Feb. 11, 1941.    B. E. LENEHAN ET AL    2,231,725
POLYPHASE DIRECTIONAL RELAY
Filed March 31, 1939
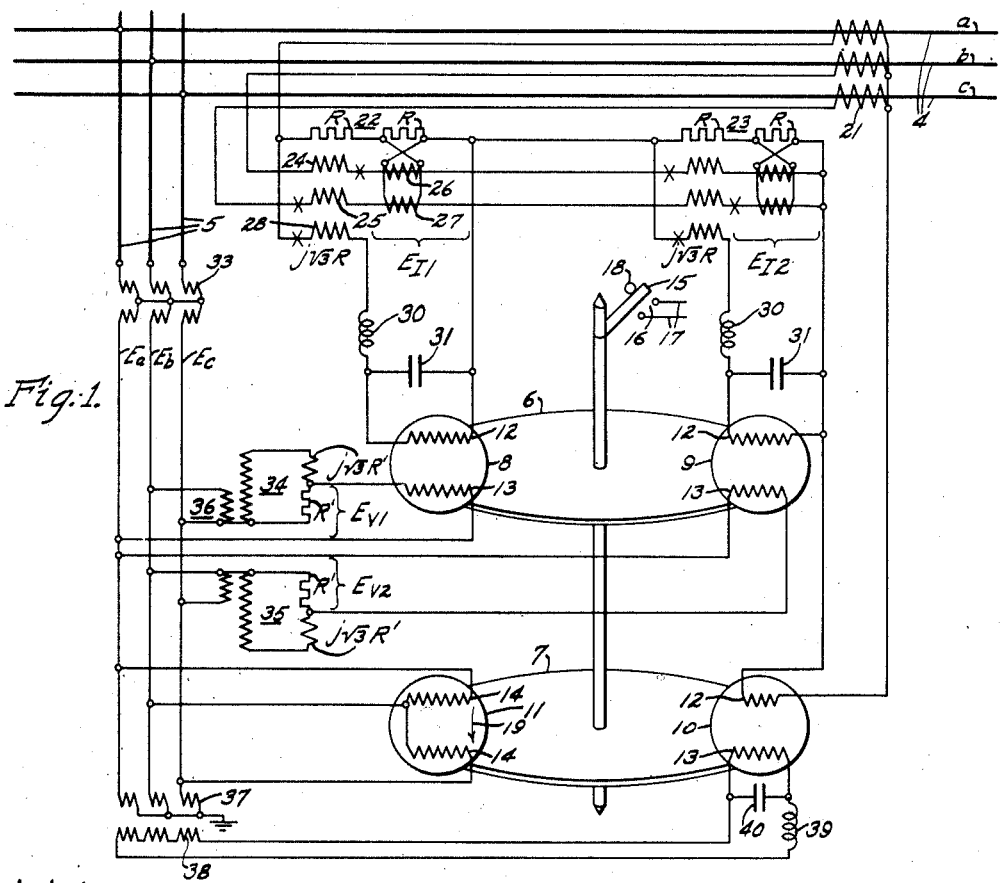
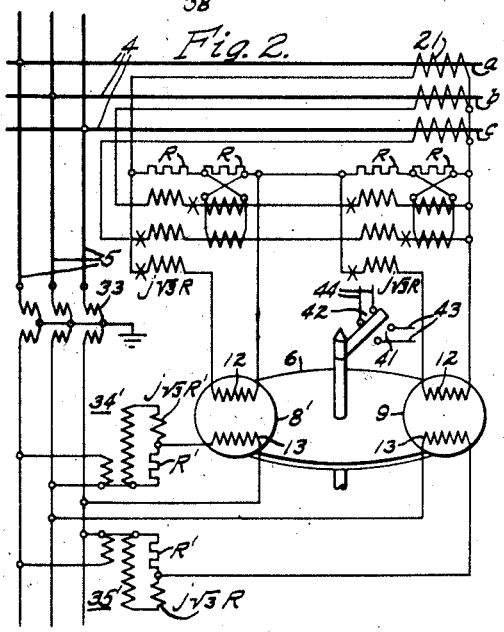
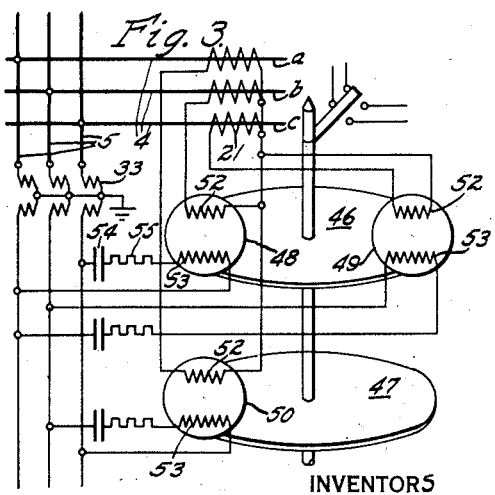
INVENTORS
Bernard E. Lenehan, Edwin L. Harder
and William A. Lewis.
BY O. B. Buchanan
ATTORNEY Patented Feb. 11, 1941

2,231,725

UNITED STATES PATENT OFFICE 2,231,725

POLYPHASE DIRECTIONAL RELAY

Bernard E. Lenehan, Bloomfield, N. J., Edwin L. Harder, Forest Hills, Pa., and William A. Lewis, Ithaca, N. Y., assignors to Westinghouse Electric & Manufacturing Company, East Pittsburgh, Pa., a corporation of Pennsylvania Application March 31, 1939, Serial No. 265,254

11 Claims. (Cl. 175—294)

Our invention relates to improved polyphase wattmeter mechanisms for obtaining responses on three-phase lines which are subject, at times, to zero-phase-sequence currents and voltages. More particularly, our invention relates to a combination phase- and ground-directional element which responds in the proper direction for any of the ten different types of fault.

Heretofore, polyphase wattmeters have been utilized as directional relaying elements, for obtaining an indication of the direction of the line-current for protective relaying purposes. In a three-phase line, the power is equal to the sum of the positive-phase-sequence power-component, the negative-phase-sequence power component and the zero-phase-sequence power-component, all multiplied by the cosine of an angle which is the algebraic sum of the power-factor angle of the current plus or minus the optimum response-angle for which the wattmeter is connected. In the foregoing, the word "power" is utilized in the sense of a product of current and voltage times the cosine of an angle which may be an arbitrary angle. Ordinarily, polyphase directional elements have been set to have a maximum response at the prevailing power-factor angle of the fault-currents, according to the constants of the particular transmission-line being protected.

Our invention relates to a novel relaying means and method which is based upon a concept of power-measurement for relaying purposes, utilizing wattmeter elements which do not respond to the actual polyphase power at all, or to the actual polyphase power times the cosine of an angle, but a relay element which responds to a different arbitrary function which is made up of a positive response to a function of the positive-phase-sequence power-component, a negative response to a function of the negative-phase-sequence power-component, and a zero response to a function of the zero-phase-sequence power-component, or to combinations of two of these three responses, either with or without a restraint on the directional element in response to polyphase line-voltage conditions or in response to any other fault-detecting conditions.

A basic idea of our invention is predicated upon the concept that the fault itself is the source of negative- and zero-phase-sequence power. The relaying equipment is located at some intermediate point between a generator and the fault, and the generator supplies only positive-phase-sequence power, a part of which is converted, at the fault, into negative- and zero-phase-sequence power-components, dependent upon the nature of the fault. Heretofore, a very large number of wattmeter connections and combinations have been investigated, and some of them have been used, with unreliable relaying operations, but the precise means or combinations for obtaining the best results have not been singled out, recognized, or produced in actual practice. According to our invention, we have for the first time provided means for reliably responding to a positive-phase-sequence power-component flowing out toward the fault, and to negative- and zero-phase-sequence power-components flowing back from the fault.

The objects of our invention are, therefore, to provide methods and means for obtaining the novel composite phase-sequence power-response just described.

In the accompanying drawing, we have illustrated the principles of our invention in three different forms of embodiment, in three different figures, of which:

Figure 1 is a diagrammatic view of circuits and apparatus embodying our invention in a form utilizing a two-disc wattmetric directional element, the first disc responding positively to the positive-phase-sequence power and responding negatively to the negative-phase-sequence power, while the second disc responds negatively to the zero-phase-sequence power, and also has a voltage-responsive restraint imposed thereon; and Figs. 2 and 3 are similar views showing alternative equivalents of the first wattmeter disc of Fig. 1.

In the following explanation of our invention, we shall, in general, utilize the same conventions as those explained in a book entitled "Symmetrical Components," by C. F. Wagner and R. D. Evans, published in 1933 by McGraw-Hill Book Company. In general, it may be noted that the different phases of the star currents and voltages are designated by lower-case subscripts $a$, $b$, $c$, wherein phase-$b$ is the next lagging phase after any phase which is arbitrarily designated as phase-$a$ for reference-purposes, and phase-$c$ is the next lagging phase after phase-$b$, while phase-$a$ is the next lagging phase after phase-$c$. In like manner, the delta quantities are indicated by capital subscripts A, B, C. The positive-, negative- and zero-phase sequence components are designated by the subscripts 1, 2 and 0, respectively. Conjugate vectors are distinguished by a circumflex accent, while the absolute or scalar values of the vectors are indicated by bars placed over the symbol for the vector. The fundamental phase-sequence equations for the different phases of the voltages and currents are given by the following equations:

$$E_a = E_0 + E_1 + E_2$$
$$E_b = E_0 + a^2 E_1 + a E_2 \quad \quad \quad \quad \quad (1)$$
$$E_c = E_0 + a E_1 + a^2 E_2$$

and $$\hat{I}_a = \hat{I}_0 + \hat{I}_1 + \hat{I}_2$$
$$\hat{I}_b = \hat{I}_0 + a\hat{I}_1 + a^2\hat{I}_2 \quad \quad \quad \quad \quad (2)$$
$$\hat{I}_c = \hat{I}_0 + a^2\hat{I}_1 + a\hat{I}_2$$

where $$a = e^{j120°} = -\frac{1}{2} + j\frac{1}{2}\sqrt{3}$$

$$a^2 = e^{j240°} = -\frac{1}{2} - j\frac{1}{2}\sqrt{3}$$

$$j = e^{j90°}$$

and $e$ = base of natural logarithms.

Our invention, in at least one of its aspects, is predicated upon the discovery that it is not desirable to utilize a directional wattmeter which responds to ordinary polyphase power, which is measured by $$3(E_1\hat{I}_1 + E_2\hat{I}_2 + E_0\hat{I}_0) = 3(P + N + Z) \quad \quad (3)$$

When the wattmeter mechanism is utilized as a directional element for responding to the directions of fault-currents in a protected line, it is not desired to have a response to the actual power, as represented in Equation 3. The desired response is a response which is responsive solely to the superimposed fault-currents, preferably to the exclusion of the load-currents, unless the fault-currents are so much larger than the load-currents that the latter may safely be disregarded, and this desired response is also one in which the directions of the negative- and zero-phase-sequence responses N and Z are reversed with respect to the positive-sequence response P, as indicated by the equation $$E_1\hat{I}_1 - E_2\hat{I}_2 - KE_0\hat{I}_0 = P - N - KZ \quad \quad (4)$$

where K is any constant of any predetermined phase-angle and magnitude. This is because the fault itself becomes the source of the negative- and zero-phase-sequence currents and voltages, so that these particular currents are flowing back from the fault, instead of flowing out to the fault, as in the case of the positive-sequence currents. If desired, another constant K' may be introduced in the response to the negative-phase-sequence power-component $E_2\hat{I}_2 = N$.

The three responses to +P, —N and —Z may be separately obtained by the utilization of three wattmeter elements energized respectively in response to the proper phase-sequence components of currents and voltages derived from the line, or the (P—N) response may be obtained by utilizing an ordinary polyphase wattmeter combinatiton in which polyphase transformation-means have been utilized for rotating either the polyphase voltage-vectors or the polyphase current-vectors through 90 degrees, and eliminating the zero-phase-sequence components from either the current or the voltage-vectors, or, in general, the polyphase transformation-means may rotate the current or voltage-vectors through any predetermined angle, and the zero-phase-sequence components may be eliminated from both the current and voltage-vectors.

In Fig. 1, we show a form of embodiment of our invention as applied to the protection of a three-phase line-section 4, having individual phase conductors a, b, c, connected to a station-bus 5. Although we are not limited to any particular type of wattmeter, we have illustrated our invention in Fig. 1, as well as in the other two figures of the drawing, as being embodied in a wattmeter of the type having one or more discs 6 and 7, which are operated upon by a plurality of wattmeter elements 8, 9, 10 and 11.

In the form of embodiment as shown in Fig. 1, the elements 8, 9 and 10 each have a current-responsive winding 12 and a voltage-responsive winding 13, these cooperating windings having the property of producing a maximum response when the impressed voltage is in phase with the impressed current. The fourth element 11 has two voltage-responsive windings 14 which are energized from different delta voltages of the line. The first and second wattmeter elements 8 and 9 are mounted in cooperative relation to the first disc 6, while the third and fourth wattmeter elements 10 and 11 are mounted in cooperative relation to the second disc 7. The two discs 6 and 7 are mounted on a common shaft carrying a movable arm 15 for opening or closing any desired kind of contact-members 16 which may be included in a relaying circuit 17. The movable arm 15 may be normally held against a backstop 18 by the restraining torque of the fourth wattmeter element 11, as indicated by the arrow 19 on said element.

In the form of our invention shown in Fig. 1, we utilize a set of line current transformers 21 which supply current to a positive-phase-sequence network 22 and to a negative-phase-sequence network 23. These networks may take different forms, which are known in the art. In the illustrated form of embodiment, each of the phase-sequence current-responsive networks 22 and 23 comprises a pair of resistors R traversed by $I_a$, two windings 24 and 25 of a three-winding inductance-device $j\sqrt{3}R$ traversed by the currents $I_b$ and $I_c$ respectively, and two auxiliary current transformers 26 and 27 which are utilized to cause one of the resistors R to be traversed also by $(-I_b - I_c)$.

The output-circuits of the two current-responsive phase-sequence networks 22 and 23 are designated by $E_{11}$ and $E_{12}$ respectively. In each case, these output circuits, or measuring circuits, include the third winding 28 of the three-winding reactor $j\sqrt{3}R$, and in addition to including the voltages induced in said third winding 28, each measuring circuit also responds to the voltage-drops across the two resistors R and R. The two current-responsive phase-sequence networks 22 and 23 are identical, except for the direction of connection of the various windings of the reactor $j\sqrt{3}R$, as indicated by the polarity marks X.

The output-voltage $E_{11}$ of the positive-phase-sequence current-responsive network 22 is supplied to the current-responsive winding 12 of the first wattmeter element 8 through a phase-rotational multiplier $e^{j\phi}$ which is illustrated in the form of a multiplier $e^{-j\phi}$ in series with a reversely connected current-coil 12, the multiplier $e^{-j\phi}$ consisting of a serially connected inductance 30 and a shunt-connected capacitor 31, the latter being connected in shunt to the current-responsive winding 12. The output-voltage $-E_{12}$ of the negative-phase-sequence current-responsive network 23 is similarly applied to the current-responsive winding 12 of the second wattmeter element 9 through a similar phase-rotational multiplier 30—31.

The neutral current of the line current transformers 21 is supplied to the current-responsive winding 12 of the third wattmeter element 10, as indicated.

In Fig. 1, we also show a star-star-connected potential transformer 33 which furnishes the relaying voltages $E_a$, $E_b$ and $E_c$. We also utilize a positive-phase-sequence voltage-responsive network 34 and a negative-phase-sequence voltage-responsive network 35, for producing the respective measuring-circuit voltages $E_{V1}$ and $E_{V2}$. Except for the connections to the several voltage-conductors $E_a$, $E_b$ and $E_c$, the two voltage-responsive networks 34 and 35 are identical and consist of a 1-to-2 ratio auxiliary transformer 36 supplying a 60-degree impedance in the form of a resistor $R'$ and an inductance $j\sqrt{3}R'$. The output voltages $E_{V1}$ and $E_{V2}$ are supplied to the voltage-coils 13 of the first and second wattmeter elements 8 and 9 respectively.

In Fig. 1, we also utilize an auxiliary star-delta transformer 37 having an open-delta secondary 38 which energizes the voltage-responsive winding 13 of the third wattmeter element 10 through a series inductance 39 and a shunt capacitor 40.

The two windings 14 of the fourth wattmeter element 11 are energized from different delta voltages, in a known manner, so as to obtain a polyphase responsive to the line-voltages.

The connections of the four phase-sequence networks 22, 23, 34 and 35 of Fig. 1 are such as to give the following responses, respectively:

$$E_{I1} = j\sqrt{3}R(I_b - I_c) + RI_a + R(I_a - I_b - I_c) = 6RI_1 \quad (5)$$

$$E_{I2} = j\sqrt{3}R(I_c - I_b) + RI_a + R(I_a - I_b - I_c) = 6RI_2 \quad (6)$$

$$E_{V1} = (E_c - E_b)\left(\frac{1}{2} - j\frac{1}{2}\sqrt{3}\right) + (E_a - E_c) = 3E_1 \quad (7)$$

$$E_{V2} = (E_b - E_c)\left(\frac{1}{2} - j\frac{1}{2}\sqrt{3}\right) + (E_a - E_b) = 3E_2 \quad (8)$$

Let $A =$ fault-current power-factor angle (lagging) $\quad (9)$ $\phi =$ phase-angle of a phase-rotational multiplier $e^{-j\phi}$ if applied to the voltage-coil or $e^{j\phi}$ as applied to the current coil $\quad (10)$ $E_{V1} = 3\overline{E}_1$, (taking $E_1$ as the datum line) $\quad (11)$ $I_1 = \overline{I}_1$, (in phase with $\overline{E}_1$) at unity power factor, without the multiplier $e^{j\phi}$ $\quad (12)$ $\hat{I}_1 = \overline{I}_1 e^{j(A-\phi)}$ with the multiplier $e^{j\phi}$ $\quad (13)$ $\theta =$ phase-angle of the current-coil impedance $\overline{Z}_c j^\theta$ $\quad (14)$ Then the conjugate vector of the current in the current-coil of the first wattmeter-element is $$\hat{I}_{i1} = \frac{\hat{E}_{I1}}{\overline{Z}_c e^{-j\theta}} = \frac{1}{\overline{Z}} \hat{E}_{I1} e^{j\theta} = \frac{6R}{\overline{Z}} \hat{I}_1 e^{j\theta} = \frac{6R}{\overline{Z}} \overline{I}_1 e^{j(A-\phi+\theta)} \quad (15)$$

The response of the first wattmeter-element 8 in Fig. 1 is the real part of $$W_1 = E_{V1} \hat{I}_{i1} = \frac{18R}{\overline{Z}} \overline{E}_1 \overline{I}_1 e^{j(A-\phi+\theta)} = \frac{18R}{\overline{Z}} \overline{E}_1 \overline{I}_1 \cos(A - \phi + \theta) \quad (16)$$

Similarly, the response of the second wattmeter-element 9 in Fig. 1 is the real part of $$W_2 = E_{V2} \hat{I}_{i2} = \frac{18R}{\overline{Z}} \overline{E}_2 \overline{I}_2 e^{j(A-\phi+\theta)} = \frac{18R}{\overline{Z}} \overline{E}_2 \overline{I}_2 \cos(A - \phi + \theta) \quad (17)$$

These responses are maximum when $$A - \phi + \theta = 0$$

giving $$\phi = A + \theta \quad (18)$$

In the type of wattmeter under consideration, it may be considered that the phase-angle of the coil-impedance is very close to zero, giving $$\theta = 0 \quad (19)$$

and hence $$\phi = A \quad (20)$$

or it may be considered that the angle $\phi$ represents the phase-angle of the total effective impedance in the current-coil circuit.

In faults involving ground-fault resistance, and particularly in the case of single line-to-ground faults, or simply ground-faults, the ground resistance causes the fault-current to have a somewhat smaller angle of lag than if the grounding resistance were not present, as in the case of three-phase faults or the case of line-to-line faults, or simply phase-faults. Typical values of the angle $A$ are 60° and 45° for phase-faults and ground-faults, respectively, although it will be understood that our invention is by no means limited to these particular values.

In Fig. 1, the first and second wattmeter elements 8 and 9 are so connected as to be positively responsive to the positive-sequence power P at any optimum power-factor, and to be negatively responsive to the negative-sequence power N at any optimum power-factor. If the multiplying factors applicable in each case are the same, the total response of the first and second elements combined will, therefore, be in accordance with (P−N). The third wattmeter element 10 is so connected as to be negatively responsive to the zero-sequence power Z at any optimum power-factor, preferably with a weighting-factor K greater than 1.

According to Equation 20 the phase-rotational multiplier $e^{j\phi}$ in the current-coil circuit, as indicated at 30—31 in Fig. 1, becomes an inductive-impedance multiplier $e^{-jA}$, where typical values of A may be 60° for phase-faults and 45° for ground-faults. In the case of the positive-phase-sequence wattmeter-element 8, the value of A may be chosen as somewhat more, in order to minimize the response to the positive-phase-sequence load-currents which are flowing in the line at the time of the fault.

In operation, the wattmeter mechanism of Fig. 1 is normally held in inoperative position, against its backstop 18, by the polyphase-voltage-responsive restraint of the fourth wattmeter element 11, or, in general, by any equivalent means for normally applying a restraint during fault-free line-conditions, and for removing or lessening said restraint in response to a fault-condition in the line, as when the polyphase line-voltages collapse or partially collapse. Normally, the response of the first wattmeter element 8 to the balanced positive-phase-sequence load-currents in the line is not sufficient to overcome the restraint of the fourth element 11. During fault-conditions, however, the response of the second element 9 to a function of the negativephase-sequence product $-E_2I_2$, and the response of the third element 10 to a function of the zero-phase-sequence product $-E_0\hat{I}_0$, assist the first element in overcoming the reduced restraint of the fourth element so as to actuate the relay, provided that the fault is on the line-side of the relay, and regardless of the nature of the fault, whether a three-phase fault, a line-to-line phase-fault, a double line-to-ground phase-fault, or a single line-to-ground fault.

We may obtain the same effect as in Fig. 1, without requiring any multiplier 30—31, if we obtain a negative 60-degree phase-shift $e^{-j60°}$ of the voltage-coil response. This may be accomplished, in the positive-sequence voltage-network 34', as illustrated in Fig. 2, by choosing phase-$c$, instead of phase-$a$, as the reference-phase, and in the negative-sequence voltage-network 35', as illustrated in Fig. 2, by choosing phase-$b$ instead of phase-$a$. Then Equations 7 and 8 become $$-E'_{v1} = (E_a - E_b)\left(\frac{1}{2} - j\frac{1}{2}\sqrt{3}\right) + (E_b - E_c) = 3E_1 e^{-j60°} \quad (21)$$

and $$-E'_{v2} = (E_a - E_c)\left(\frac{1}{2} - j\frac{1}{2}\sqrt{3}\right) + (E_c - E_b) = 3E_2 e^{-j60°} \quad (22)$$

Thus, with the voltage-coils of the positive and negative phase-sequence wattmeter elements energized in accordance with $-E'_{v1}$ and $-E'_{v2}$, the wattmetric responses become $$W'_1 = E'_{v1}\hat{I}_{i1} = \frac{18R}{Z}\overline{E}_1\overline{I}_1 e^{j(A-60°)} \quad (23)$$

and $$W'_2 = E'_{v2}\hat{I}_{i2} = \frac{18R}{Z}\overline{E}_2\overline{I}_2 e^{j(A-60°)} \quad (24)$$

This will give a maximum response of the first wattmeter element 8' in Fig. 2 when $A=60°$, or when the fault-current has a 60° lagging power-factor.

The foregoing connections, as represented by Equations 21 to 24, are shown in Fig. 2, which shows the equivalent of only the first wattmeter-disc 6 of Fig. 1.

In Fig. 2, the wattmetric directional element is illustrated as being of a type having front- and back-contacts 41 and 42 which are included in the relaying circuits 43 and 44 respectively. The connections of the apparatus shown in Fig. 2 are the same as in Fig. 1, except for the above-described changes in the connections of the voltage-responsive networks 34' and 35', and except for the omission of the phase-rotational multiplier 30—31, and for the omission of the third and fourth wattmeter elements 10 and 11. The connections in Fig. 2 are again of a sort to give a positive response to the positive-sequence power P and a negative response to the negative-sequence power N or, if the multipliers are identical, to give a response to (P—N).

In Fig. 3, we illustrate means for obtaining the (P—N) response without resorting to the phase-sequence current- and voltage-networks 22, 23, 34 and 35 respectively. In this embodiment of our invention we utilize a wattmetric directional element in which the portion which responds to (P—N) comprises two discs 46 and 47 which are operated upon by three wattmeter elements 48, 49 and 50. These three elements 48, 49 and 50 are properly energized from three different phases of line-derived currents and line-derived voltages, in a manner which will now be described.

The connections in Fig. 3 are a modification of the ordinary wattmeter connections, which ordinary wattmeter connections give a response to the true power in accordance with the equation $$E_a\hat{I}_a + E_b\hat{I}_b + E_c\hat{I}_c = 3E_1\hat{I}_1 + 3E_2\hat{I}_2 + 3E_0\hat{I}_0$$
$$= 3(P+N+Z) \quad (25)$$

In order to obtain the (P—N) response, we rotate either the polyphase voltage-vectors or the polyphase current-vectors, which are applied to the relay, through 90°. In the illustrated form of embodiment, we rotate the voltage-vectors through 90° by replacing the star voltages $E_a$, $E_b$ and $E_c$ in Equation 25 with the delta voltages $E_A$, $E_B$ and $E_C$ in accordance with the equations $$\left.\begin{array}{l}E_A = E_c - E_b\\E_B = E_a - E_c\\E_C = E_b - E_a\end{array}\right\} \quad (26)$$

It will be noted that $E_A$ leads $E_a$ by 90° under balanced positive-phase-sequence conditions on the line. With these substitutions, Equation 25 becomes $$(E_b - E_c)\hat{I}_a + (E_c - E_a)\hat{I}_b + (E_a - E_b)\hat{I}_c =$$
$$-j3\sqrt{3}(P-N) \quad (27)$$

The connections in Fig. 3 are in accordance with Equation 27. Thus, the three current-windings 52 of the three wattmeter elements 50, 48 and 49 are energized respectively with $I_a$, $I_b$ and $I_c$, from the line-current transformers 21, and the three voltage-windings 53 are energized respectively with the delta voltages ($E_b-E_c$), ($E_c-E_a$) and ($E_a-E_b$). Associated with each of the voltage-windings 53, we have shown a serially connected phase-rotational multiplier $e^{j\phi}$, which is illustrated as comprising a serially connected capacitor 54 and a serially connected resistor 55. Including the effects of the fault-current power-factor angle A and the phase-rotational multiplier $e^{j\phi}$, and replacing $-j$ with $e^{-j90°}$, Equation 27 will show that the correspondingly connected wattmetric directional element which is illustrated in Fig. 3 will have a response in accordance with the real part of $$W_{(27)} = 3\sqrt{3}(P-N)e^{-j(90°-A-\phi)}$$
$$= 3\sqrt{3}(P-N)\cos(90°-A-\phi) \quad (28)$$

This response is a maximum when $$90° - A - \phi = 0$$
$$\phi = 90° - A \quad (29)$$

It will be understood, of course, that substitutions of parts may be freely made from any one of the three figures of the drawing to any other figure, and that the additional wattmeter elements 10 and 11 of Fig. 1, while in general very desirable, may be added or omitted in any one of the three figures.

While we have illustrated our invention in three different forms of embodiment, we wish it to be understood that these three different forms of embodiment are only by way of illustration, and that various substitutions of equivalent parts, omissions of unneeded parts, or additions of supplementary parts may be made by those skilled in the art without departing from the essential broad features of our invention. We desire, therefore, that the appended claims shall be accorded the broadest construction consistent with their language and the prior art.

We claim as our invention:

1. A polyphase wattmetric directional relaying mechanism for determining fault-current direction in a protected three-phase line which is subject, at times, to zero-phase-sequence currents and voltages, comprising a first wattmeter-means having mutually reacting windings and means for so energizing the respective windings of said first wattmeter-means that said first wattmeter-means is responsive to functions of $E_1 \hat{I}_1$ and $-E_2 \hat{I}_2$, a second wattmeter-means having mutually reacting windings and means for so energizing the respective windings of said second wattmeter-means that said second wattmeter-means is responsive to a function of $-E_0 \hat{I}_0$, where $E_1$, $E_2$ and $E_0$ respectively represent positive, negative and zero phase-sequence components of a set of polyphase voltages of the line, and $\hat{I}_1$, $\hat{I}_2$ and $\hat{I}_0$ respectively represent the conjugate vectors of positive, negative and zero phase-sequence components of a set of polyphase currents of the line, both of said wattmeter means being substantially selectively and exclusively responsive to the respective named quantities to the substantial exclusion of responses to any other quantity, both of said wattmeter means being operative on a common movable member, and relay-contact means responsive to the movement of said common movable member.

2. A polyphase wattmetric directional relaying mechanism for determining fault-current direction in a protected three-phase line which is subject, at times, to zero-phase-sequence currents and voltages, comprising a first wattmeter-means having mutually reacting windings and means for so energizing the respective windings of said first wattmeter-means that said first wattmeter-means is responsive to a function of $(E_1 \hat{I}_1 - E_2 \hat{I}_2)$, a second wattmeter-means having mutually reacting windings and means for so energizing the respective windings of said second wattmeter-means that said second wattmeter-means is responsive to a function of $-E_0 \hat{I}_0$, where $E_1$, $E_2$ and $E_0$ respectively represent positive, negative and zero phase-sequence components of a set of polyphase voltages of the line, and $\hat{I}_1$, $\hat{I}_2$ and $\hat{I}_0$ respectively represent the conjugate vectors of positive, negative and zero-phase-sequence components of a set of polyphase currents of the line, both of said wattmeter means being substantially selectively and exclusively responsive to the respective named quantities to the substantial exclusion of responses to any other quantity, both of said wattmeter means being operative on a common movable member, and relay-contact means responsive to the movement of said common movable member.

3. A polyphase wattmetric directional relaying mechanism for determining fault-current direction in a protected three-phase line which is subject, at times, to zero-phase-sequence currents and voltages, comprising a first wattmeter-means having mutually reacting windings and means for so energizing the respective windings of said first wattmeter-means that said first wattmeter-means is responsive to a function of $E_1 \hat{I}_1$, a second wattmeter-means having mutually reacting windings and means for so energizing the respective windings of said second wattmeter-means that said second wattmeter-means is responsive to a function of $-E_2 \hat{I}_2$, a third wattmeter-means having mutually reacting windings and means for so energizing the respective windings of said third wattmeter-means that said third wattmeter-means is responsive to a function of $-E_0 \hat{I}_0$, where $E_1$, $E_2$ and $E_0$ respectively represent positive, negative and zero phase-sequence components of a set of polyphase voltages of the line, and $\hat{I}_1$, $\hat{I}_2$ and $\hat{I}_0$ respectively represent the conjugate vectors of positive, negative and zero phase-sequence components of a set of polyphase currents of the line, each of said wattmeter means being substantially selectively and exclusively responsive to the respective named quantities to the substantial exclusion of responses to any other quantity, each of said wattmeter means being operative on a common movable member, and relay-contact means responsive to the movement of said common movable member.

4. A polyphase wattmetric directional relaying mechanism for determining fault-current direction in a protected three-phase line which is subject, at times, to zero-phase-sequence currents and voltages, comprising a first wattmeter-means having mutually reacting windings and means for so energizing the respective windings of said first wattmeter-means that said first wattmeter-means is responsive to substantially the same functions of $E_1 \hat{I}_1$ and $-E_2 \hat{I}_2$, a second wattmeter-means having mutually reacting windings and means for so energizing the respective windings of said second wattmeter-means that said second wattmeter-means is responsive to a function of $-E_0 \hat{I}_0$, where $E_1$, $E_2$ and $E_0$ respectively represent positive, negative and zero phase-sequence components of a set of polyphase voltages of the line, and $\hat{I}_1$, $\hat{I}_2$ and $\hat{I}_0$ respectively represent the conjugate vectors of positive, negative and zero phase-sequence components of a set of polyphase currents of the line, both of said wattmeter means being substantially selectively and exclusively responsive to the respective named quantities to the substantial exclusion of responses to any other quantity, both of said wattmeter means being operative on a common movable member, and relay-contact means responsive to the movement of said common movable member.

5. A polyphase wattmetric directional relaying mechanism for determining fault-current direction in a protected three-phase line, comprising a first wattmeter-means having mutually reacting windings and means for so energizing the respective windings of said first wattmeter-means that said first wattmeter-means is responsive to a function of $E_1 \hat{I}_1$, a second wattmeter-means having mutually reacting windings and means for so energizing the respective windings of said second wattmeter-means that said second wattmeter-means is responsive to a function of $-E_2 \hat{I}_2$, where $E_1$ and $E_2$ respectively represent positive and negative phase-sequence components of a set of polyphase voltages of the line, and $\hat{I}_1$ and $\hat{I}_2$ respectively represent the conjugate vectors of positive and negative phase-sequence components of a set of polyphase currents of the line, both of said wattmeter means being substantially selectively and exclusively responsive to the respective named quantities to the substantial exclusion of responses to any other quantity, both of said wattmeter means being operative on a common movable member, and relay-contact means responsive to the movement of said common movable member.

6. Apparatus for determining fault-current direction in a three-phase line, comprising a first means for obtaining a positive response to a function of $E_1 \hat{I}_1$, a second means for obtaining a negative response to a function of $E_2 \hat{I}_2$, and means for utilizing the algebraic sum of said responses in the control of a relay-circuit contact, where $E_1$ and $E_2$ respectively represent positive and negative phase-sequence components of a set of polyphase voltages of the line, and $\hat{I}_1$ and $\hat{I}_2$ respectively represent the conjugate vectors of positive and negative phase-sequence components of a set of polyphase currents of the line.

7. Apparatus for determining fault-current direction in a three-phase line which is subject, at times, to zero-phase-sequence currents and voltages, comprising means for obtaining a positive response to a function of $E_1\hat{I}_1$ and negative responses to a function or functions of $E_2\hat{I}_2$ and $E_0\hat{I}_0$, and means for utilizing the algebraic sum of said responses in the control of a relay-circuit contact, where $E_1$, $E_2$ and $E_0$ respectively represent positive, negative and zero phase-sequence components of a set of polyphase voltages of the line, and $\hat{I}_1$, $\hat{I}_2$ and $\hat{I}_0$ respectively represent the conjugate vectors of positive, negative and zero phase-sequence components of a set of polyphase currents of the line.

8. The invention as defined in claim 1, in combination with means for normally imposing a restraint against the operation of said directional relaying mechanism and for reducing said restraint in response to a fault-condition in the line.

9. The invention as defined in claim 5, in combination with means for normally imposing a restraint against the operation of said directional relaying mechanism and for reducing said restraint in response to a fault-condition in the line.

10. The invention as defined in claim 6, in combination with means for normally imposing a restraint against the operation of said directional relaying mechanism and for reducing said restraint in response to a fault-condition in the line.

11. The invention as defined in claim 7, in combination with means for normally imposing a restraint against the operation of said directional relaying mechanism and for reducing said restraint in response to a fault-condition in the line.

BERNARD E. LENEHAN.
EDWIN L. HARDER.
WILLIAM A. LEWIS.